United States Patent Office 3,651,068
Patented Mar. 21, 1972

3,651,068
DERIVATIVES OF 1,2,3,4-TETRAHYDROBENZO-THIENO[2,3-c]PYRIDINES
John T. Suh, Mequon, Wis., assignor to Colgate-Palmolive Company, New York, N.Y.
No Drawing. Continuation-in-part of application Ser. No. 705,909, Feb. 16, 1968, now Patent No. 3,520,895, which is a continuation-in-part of application Ser. No. 621,475, Mar. 8, 1967. This application Nov. 13, 1969, Ser. No. 876,600
Int. Cl. C07d *31/50*
U.S. Cl. 260—294.8 B        7 Claims

ABSTRACT OF THE DISCLOSURE

The compounds are derivatives of 1,2,3,4 - tetrahydrobenzothieno[2,3 - C]pyridines and 1,2,3,4 - tetrahydro-5H - benzothieno[2,3 - C]azepines useful as tranquilizing and antihypertensive agents. Compounds disclosed are 2 - β - diethylaminopropyl - 1 - phenyl - 1,2,3,4 - tetrahydrobenzothieno[2,3 - C]pyridine and 1 - (p - chlorophenyl) - 1,2,3,4 - tetrahydrobenzothieno[2,3-C]pyridine.

RELATED CASES

The present application in a continuation-in-part of my copending application Ser. No. 705,909 filed Feb. 16, 1968, now U.S. Pat. No. 3,520,895 which is in turn a continuation-in-part of my earlier application Ser. No. 621,475 filed Mar. 8, 1967, now abandoned.

DETAILED DESCRIPTION

The compounds of the present invention have the following formula:

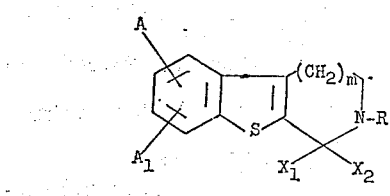

wherein A and $A_1$ are selected from hydrogen, hydroxy, nitro, lower alkyl groups of 1 to 4 carbon atoms such as methyl, ethyl or isopropyl, lower alkoxy groups such as methoxy, ethoxy and propoxy, halo such as bromo, chloro and fluoro and trifluoromethyl, m is 1 or 2, R is a group selected from hydrogen, a lower alkyl of 1 to 4 carbon atoms, an aralkyl of 7 to 11 carbon atoms, such as benzyl, phenethyl and phenylisopropyl and including halo and lower alkoxy substituted phenyl-lower alkyls such as o-chlorobenzyl and p-methoxybenzyl, $(CH_2)_n$—OH in which n is 2 to 6, and B—Am in which B is an alkylene of 2 to 6 carbon atoms and Am is selected from (a)

in which $R_1$ and $R_2$ may be the same or different groups selected from hydrogen, lower alkyl of 1 to 4 carbon atoms, lower alkyl-tertiaryamino such as diethylamino-ethyl, hydroxy-lower alkyl such as hydroxyethyl, a lower alkenyl of 3 to 6 carbon atoms such as allyl and hexenyl, phenyl, nuclear substituted phenyl, particularly a halophenyl such as o-chlorophenyl and an alkoxyphenyl such as p-methoxyphenyl, cycloalkyl groups, particularly those containing 3 to 7 carbon atoms and including cyclohexyl and cyclopentyl, cycloalkyl-lower alkyl groups, particularly those in which the cycloalkyl contains 3 to 7 carbon atoms such as cyclohexyl-methyl and cyclopentyl-ethyl, (b) Groups in which

represents an amino group such as morpholino, pyrrolidino, piperidino, N-lower alkyl piperazino groups such as N-methyl-piperazino, N-(phenyl-lower alkyl)-piperazino groups such as N-benzylpiperazino and 4-(alpha-methylphenethyl)-piperazino and N - (hydroxy-lower alkyl)-piperazino groups such as 4-(beta-hydroxyethyl)-piperazino and (c) Am is a cyclic amine group bonded through a nuclear carbon to B, including such groups as N-lower alkyl-2,3 or 4-piperidyls such as N-methyl-3-piperidyl, N-ethyl - 4 - piperidyl, N-ethyl-2-piperidyl and N-isopropyl - 3 - piperidyl, N-(di-lower alkyl amino-lower alkyl)-2,3 or 4-piperidyls such as N-(beta-dimethylaminopropyl) - 4 - piperidyl, N - (beta - diethylaminoethyl)-3-piperidy and N - (beta - dimethylaminopropyl) - 2 - piperidyl, N - phenyl-lower alkyl-3 or 4-piperidyls such as N-benzyl - 3 - piperidyl, N-phenylethyl - 4 - piperidyl and N-phenylpropyl - 3 - piperidyl, 2-piperidyl, 3-piperidyl and 4-piperidyl, 2-pyrrolidyl, 3-pyrrolidyl, N-lower alkyl-2 or 3-pyrrolidyls such as N-methyl - 2 - pyrrolidyl, N-ethyl - 3 - pyrrolidyl, N-propyl - 4 - pyrrolidyl, and N-phenyl-lower alkyl-2 or 3-pyrrolidyls such as N-benzyl-2 - pyrrolidyl and N-phenyl-ethyl - 3 - pyrrolidyl, $X_1$ is hydrogen or lower alkyl and $X_2$ is hydrogen, a lower alkyl of 1 to 4 carbon atoms, phenyl including a nuclear substituted phenyl, particularly a halophenyl such as o-chlorophenyl, or an alkoxyphenyl such as p-methoxyphenyl, aralkyl of 7 to 11 carbon atoms such as benzyl, phenethyl and phenylisopropyl and including nuclear substituted aralkyls, particularly halo and lower alkoxy substituted phenyl-lower alkyls, such as o-chlorobenzyl and dimethoxybenzyl, a heterocyclic such as pyridyl, piperidyl, furyl, thienyl, pyrryl and pyrrolidyl or B—Am.

The basic starting materials employed in the preparation of the compounds of the present invention are β-(3-thianaphthenyl)alkylamines of the formula

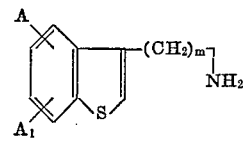

These amines may be prepared from the corresponding cyano compounds as described in the literature. [Herz J.A.C.S. 72, p. 4999 (1950)]

The starting materials may also be prepared by treating the corresponding acid with thionyl chloride followed by treatment with sodium azide and acid hydrolysis. The process may be illustrated as follows:

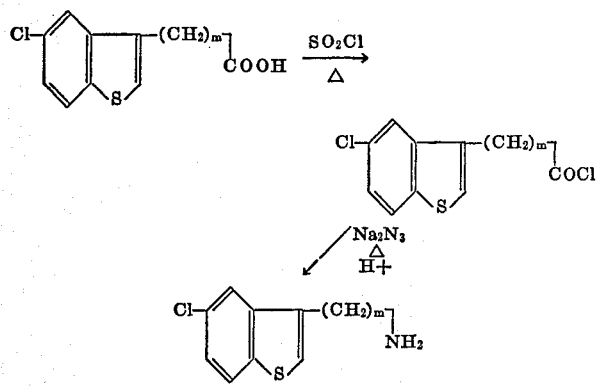

Representative of the amines which may be employed are the following:

β-(3-thianaphthenyl)ethylamine,
β-(5-chloro-3-thianaphthenyl)ethylamine,
β-(5-hydroxy-3-thianaphthenyl)ethylamine,
β-(6-trifluoromethyl-3-thianaphthenyl)ethylamine,
β-(7-methoxy-3-thianaphthenyl)ethylamine,
β-(4-bromo-3-thianaphthenyl)ethylamine, and
γ-(3-thianaphthenyl)propylamine.

The compounds of the present invention which are represented by the formula

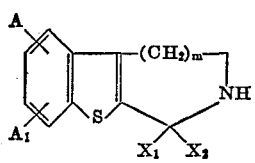

wherein $X_1$ is hydrogen may be prepared by treating a β-(3-thianaphthenyl)ethylamine with a suitable aldehyde in a concentrated liquid organic acid such as glacial acetic acid.

The above described process may be diagrammed as follows:

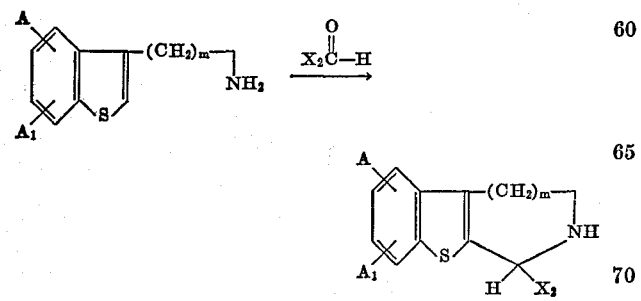

wherein A and $A_1$ are as described and do not interfere with a partake in the reaction.

Representative of the aldehydes which may be employed in the described process are the following:

Pyridine-4-carboxaldehyde,
Pyridine-2-carboxaldehyde,
Benzaldehyde,
p-Methoxybenzaldehyde,
Dimethylaminobenzaldehyde,
2-furaldehyde,
2-pyrrolicarboxaldehyde,
3-pyrrolecarboxaldehyde,
2-thiophenecarboxaldehyde, and
3-thiophenecarboxaldehyde.

Representative of the compounds which may be prepared by the described process are the following:

1-(p-chlorophenyl)-1,2,3,4-tetrahydrobenzothieno [2,3-C]-pyridine,
1-(4-pyridyl)-1,2,3,4-tetrahydrobenzothieno[2,3-C] pyridine,
1-phenyl-1,2,3,4-tetrahydrobenzothieno[2,3-C]pyridine,
1-phenyl-1,2,3,4-tetrahydro-5H-benzothieno[2,3-C] azepine,
1-ethyl-1,2,3,4-tetrahydro-5H-benzothieno[2,3-C] azepine,
1-(p-chlorophenyl)-1,2,3,4-tetrahydro-5H-benzothieno [2,3-C]azepine,
1-(p-trifluoromethylphenyl)-1,2,3,4-tetrahydro-5H-benzothieno[2,3-C]azepine,
1-(2'-pyridyl)-1,2,3,4-tetrahydro-5H-benzothieno-[2,3-C]azepine,
1-(p-methoxyphenyl)-1,2,3,4-tetrahydrobenzothieno-[2,3-C]pyridine,
1-(p-trifluoromethylphenyl)-6-hydroxy-1,2,3,4-tetrahydrobenzothieno[2,3-C]pyridine,
1-(2'-pyridyl)-7-methoxy-1,2,3,4-tetrahydrobenzothieno-[2,3-C]pyridine,
1-(2'-furyl)-5-bromo-1,2,3,4-tetrahydrobenzothieno-[2,3-C]pyridine,
1-(m-dimethylaminophenyl)-6-trifluoromethyl-1,2,3,4-tetrahydrobenzothieno[2,3-C]pyridine,
1-(2'-thienyl)-7-methoxy-1,2,3,4-tetrahydrobenzothieno-[2,3-C]pyridine,
1-(3',4'-dihydroxyphenyl)-5-chloro-1,2,3,4-tetrahydrobenzothieno[2,3-C]pyridine,
1,2,3,4-tetrahydrobenzothieno[2,3-C]pyridine,
1-(3',4',5'-trimethoxy)-8-fluoro-1,2,3,4-tetrahydrobenzothieno[2,3-C]pyridine, and
1-(3'-furyl)-6-hydroxy-1,2,3,4-tetrahydrobenzothieno-[2,3-C]pyridine.

The compounds which are represented by the formula

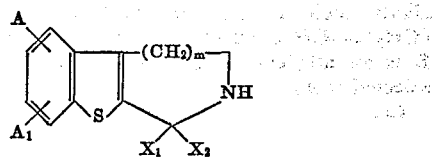

in which $X_1$ is other than hydrogen may be prepared by a variety of methods. The compounds in which $X_1$ is methyl may be prepared by treating an appropriate amine with a methyl ketone in the presence of a p-toluenesulfonic acid and toluene followed by treatment with an acid such as hydrogen chloride in an inert solvent such as ether. The described process may be illustrated as follows:

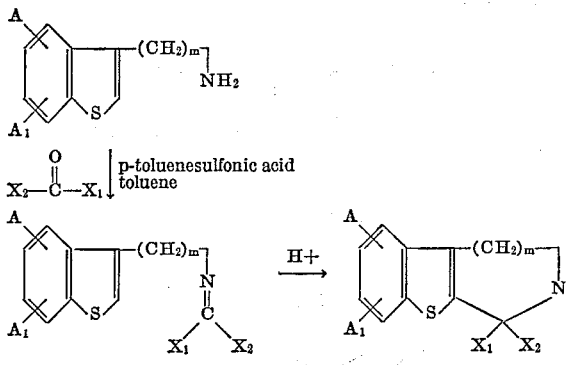

wherein $X_1$ is methyl and $A_1$ and $A_2$ are as described and represent groups that do not partake in or interfere with the reaction.

Representative of the ketones which may be employed in the described process are the following:

Acetone,
Methyl ethyl ketone,
3-pentanone,
2-pentanone, and
Acetophenone.

Representative of the compounds which may be prepared by the described process are the following:

1,1-dimethyl-1,2,3,4-tetrahydrobenzothieno[2,3-C]
  pyridine,
1-ethyl-1-methyl-1,2,3,4-tetrahydrobenzothieno[2,3-C]
  pyridine,
1-methyl-1-phenyl-1,2,3,4-tetrahydrobenzothieno[2,3-C]
  pyridine,
1-methyl-1-phenyl-1,2,3,4-tetrahydro-5H-benzothieno-
  [2,3-C]azepine, and
1,1-dimethyl-1,2,3,4-tetrahydro-5H-benzothieno[2,3-C]
  azepine.

The compounds in which $X_1$ is hydrogen and $X_2$ is alkyl or aralkyl may also be prepared by first treating the corresponding amine with a conventional acylating agent such as an acyl halide, anhydride or ester, in a suitable solvent such as benzene, toluene or xylene, preferably at reflux temperature to form the corresponding amide. The resulting amide is then treated with phosphorus pentoxide and phosphorus oxychloride in a suitable anhydrous medium such as xylene or toluene, to form the ring unsaturated 3,4-dihydrothianaphthieno[2,3-C]pyridine derivative which upon treatment with lithium aluminum hydride yields the desired ring saturated compound.

The above described process may be illustrated as follows:

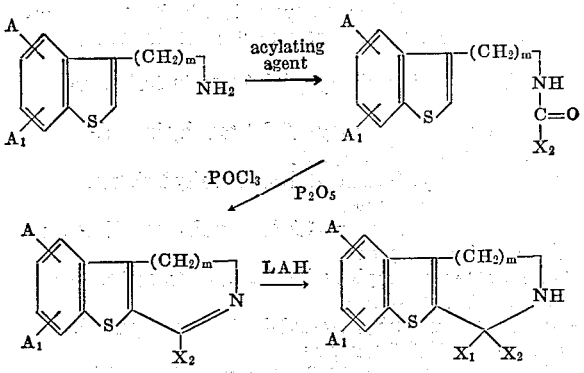

wherein A and $A_1$ are as described and represent groups that do not interfere with or partake in the reactions.

Representative of the acylating agents which may be employed are the following:

Acetyl chloride,
Acetyl bromide,
Acryloyl chloride,
β-Nitropropionyl chloride,
Propionyl chloride,
Propionyl iodide,
n-Butyryl chloride,
Benzoyl chloride,
Acetic anhydride,
Propionic anhydride,
Ethyl formate,
Benzyl formate,
γ-(N-methylpiperazino)butyryl chloride,
β-(N-methylpiperazino)propionyl chloride,
β-(morpholino)propionyl chloride,
β-[3-(N-methyl)pyrrolidyl]propionyl chloride, and
γ-(piperidyl)butyryl chloride.

Representative of some of the amides prepared by the process are the following:

N-acetyl-β-(3-thianaphthenyl)ethylamine,
N-acetyl-γ-(3-thianaphthenyl)propylamine,
N-3-nitropropionyl-β-(3'-thianaphthenyl)ethylamine,
N-3-nitropropionyl-γ-(3'-thianaphthenyl)propylamine,
N-(3,4-dimethoxyphenylacetyl)-β-(3-thianaphthenyl)
  ethylamine,
N-(3,4-dimethoxyphenylacetyl)-γ-(3-thianaphthenyl)
  propylamine,
N-acryloyl-β-(3-thianaphthenyl)ethylamine,
N-acryloyl-γ-(3-thianaphthenyl)propylamine,
N-propionyl-β-(3-thianaphthenyl)ethylamine,
N-propionyl-γ-(3-thianaphthenyl)propylamine,
N-(p-methoxyphenylacetyl)-β-(3-thianaphthenyl)ethyl-
  amine,
N-(p-methoxyphenylacetyl)-γ-(3-thianaphthenyl)propyl-
  amine,
N-iso-butyryl-β-(3-thianaphthenyl)ethylamine,
N-iso-butyryl-γ-(3-thianaphthenyl)propylamine,
N-butyryl-β-(3-thianaphthenyl)ethylamine,
N-butyryl-γ-(3-thianaphthenyl)propylamine,
N-[β-(N'-methylpiperazino)propionyl]-β'-(3-thianaph-
  thenyl)ethylamine,
N-[β-(N'-methylpiperazino)propionyl]-γ-(3-thianaph-
  thenyl)propylamine,
N-methyl-N-[β-(diethylamino)propionyl]-β'-(5-chloro-
  3-thianaphthenyl)ethylamine,
N-methyl-N-[β-(diethylamino)propionyl]-γ-(5-chloro-3-
  thianaphthenyl)propylamine,
N-β-morpholinopropionyl-β'-(6-trifluoromethyl-3-thia-
  naphthenyl)ethylamine,
N-β-[3-(N-ethyl)pyrrolidyl]-β'-(7'-methoxy-3'-thianaph-
  thenyl)ethylamine,
N-dimethylaminoacetyl-β-(5-fluoro-3-thianaphthenyl)
  ethylamine,
N-dimethylaminoacetyl-γ-(5-fluoro-3-thianaphthenyl)
  propylamine,
N-γ-(diethylamine)butyryl-β'-(5-hydroxy-3-thianaph-
  thenyl)ethylamine,
N-γ-(diethylamino)butyryl-γ-(5-hydroxy-3-
  thianaphthenyl)propylamine,
N-β-(N'-hydroxyethylpiperazino)propionyl-β'-(5-
  trifluoromethyl-3-thianaphthenyl)ethylamine, and
N-β-(N'-hydroxyethylpiperazino)propionyl-γ-(5-
  trifluoromethyl-3-thianaphthenyl)propylamine.

Representative of some of 3,4-dihydrobenzothieno[2,3-C]pyridines, 3,4-dihydro-5H-benzothieno[2,3-C]azepines, 1,2,3,4-tetrahydrobenzothieno[2,3-C]pyridines and 1,2,3-

4-tetrahydro-5H-benzothieno[2,3-C]azepines which may be prepared are the following:

1-iso-propyl-3,4-dihydrobenzothieno[2,3-C]pyridine,
1-iso-propyl-3,4-dihydro-5H-benzothieno[2,3-C]azepine,
1-(β-diethylaminoethyl)-6-hydroxy-3,4-dihydrobenzothieno[2,3-C]pyridine,
1-(β-diethylaminoethyl)-6-hydroxy-3,4-dihydro-5H-benzothieno[2,3-C]azepine,
1-methyl-3,4-dihydrobenzothieno[2,3-C]pyridine,
1-methyl-3,4-dihydro-5H-benzothieno[2,3-C]azepine,
1-(3',4'-dimethoxyphenyl)-3,4-dihydrobenzothieno[2,3-C]pyridine,
1-(3',4'-dimethoxyphenyl)-3,4-dihydro-5H-benzothieno[2,3-C]azepine,
6-chloro-1-ethyl-3,4-dihydrobenzothieno[2,3-C]pyridine,
6-chloro-1-ethyl-3,4-dihydro-5H-benzothieno[2,3-C]azepine,
1-[4'-(N-methylpiperidyl)]-7-trifluoromethyl-3,4-dihydrobenzothieno[2,3-C]pyridine,
1-[4'-(N-methylpiperidyl)]-7-trifluoromethyl-3,4-dihydro-5H-benzothieno[2,3-C]azepine,
1-[β-(N-hydroxyethylpiperazino)ethyl]-7-methoxy-3,4-dihydrobenzothieno[2,3-C]pyridine,
6-hydroxy-1-(N-methylpiperazinoethyl)-3,4-dihydrobenzothieno[2,3-C]pyridine,
1-iso-propyl-1,2,3,4-tetrahydrobenzothieno[2,3-C]pyridine,
1-iso-propyl-1,2,3,4-tetrahydro-5H-benzothieno[2,3-C]azepine,
1-ethyl-1,2,4,4-tetrahydrobenzothieno[2,3-C]pyridine,
1-ethyl-1,2,3,4-tetrahydro-5H-benzothieno[2,3-C]azepine,
1-propyl-1,2,3,4-tetrahydrobenzothieno[2,3-C]pyridine,
1-propyl-1,2,3,4-tetrahydro-5H-benzothieno[2,3-C]azepine,
1-(β-diethylaminoethyl)-6-hydroxy-1,2,3,4-tetrahydrobenzothieno[2,3-C]pyridine,
1-methyl-1,2,3,4-tetrahydrobenzothieno[2,3-C]pyridine,
1-methyl-1,2,3,4-tetrahydro-5H-benzothieno[2,3-C]azepine,
1-(3',4'-dimethoxyphenyl)-1,2,3,4-tetrahydrobenzothieno[2,3-C]pyridine,
1-(3',4'-dimethoxyphenyl)-1,2,3,4-tetrahydro-5H-benzothieno[2,3-C]azepine,
6-chloro-1-ethyl-1,2,3,4-tetrahydrobenzothieno[2,3-C]pyridine,
6-chloro-1-ethyl-1,2,3,4-tetrahydro-5H-benzothieno[2,3-C]azepine,
1-[4'-(N-methylpiperidyl)]-7-trifluoromethyl-1,2,3,4-tetrahydrobenzothieno[2,3-C]pyridine,
1-[β-(N-hydroxyethylpiperazino)ethyl]-7-methoxy-1,2,3,4-tetrahydrobenzothieno[2,3-C]pyridine, and
6-hydroxy-1-(N-methylpiperazinoethyl)-1,2,3,4-tetrahydrobenzothieno[2,3-C]pyridine.

The compounds of the present invention in which R, $X_1$ and $X_2$ are hydrogen may be prepared by several methods. For example, they may be prepared by treating a corresponding amine with paraformaldehyde in an acetate buffer such as sodium acetate and acetic acid or by reduction of the corresponding lactam. The two processes may be diagrammed as follows:

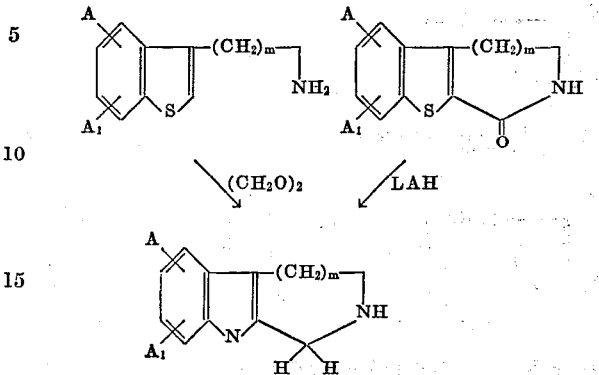

The compounds of the present invention in which R is lower alkyl may be prepared from the compounds in which R is hydrogen by a variety of conventional alkylation procedures. For example, the alkyl derivatives may be prepared by treating the unsubstituted compound with an alkyl halide or by treating it with an acyl halide, followed by reduction of the acyl derivative with an alkali metal hydride such as lithium aluminum hydride. The compounds in which R is methyl are most conveniently prepared by treating the unsubstituted compound with formaldehyde and formic acid.

The described processes may be illustrated as follows:

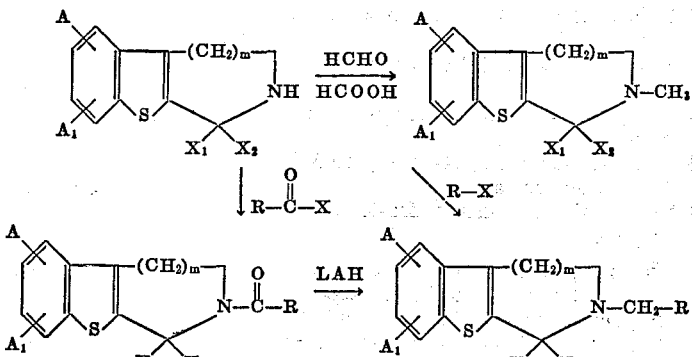

wherein RX is an alkylating agent such as an alkyl halide or a reactive ester and

is an acyl halide.

Representative of the compounds which may be prepared by the described processes are the following:

1-ethyl-2-methyl-6-methoxy-1,2,3,4-tetrahydrobenzothieno[2,3-C]pyridine,
1-ethyl-2-methyl-6-methoxy-1,2,3,4-tetrahydro-5H-benzothieno[2,3-C]azepine,
1-methyl-2-benzyl-7-chloro-1,2,3,4-tetrahydrobenzothieno[2,3-C]pyridine,
1-methyl-2-benzyl-7-chloro-1,2,3,4-tetrahydro-5H-benzothieno[2,3-C]azepine,
1-β-dimethylaminoethyl-2-ethyl-1,2,3,4-tetrahydrobenzothieno[2,3-C]pyridine,
1-β-dimethylaminoethyl-2-ethyl-1,2,3,4-tetrahydro-5H-benzothieno[2,3-C]azepine,
1,1,2-trimethyl-8-fluoro-1,2,3,4-tetrahydrobenzothieno[2,3-C]pyridine,
1,1,2-trimethyl-8-fluoro-1,2,3,4-tetrahydro-5H-benzothieno[2,3-C]azepine.

The compounds of the present invention which are represented by the formula

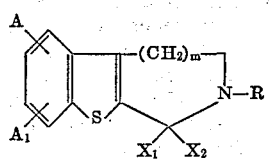

in which R is B-A*m* are conveniently prepared by first treating a corresponding unsubstituted compound with an aminoacyl halide to form the corresponding acyl amine derivative and then treating it with a chemical reducing agent such as LAH or other metal hydrides to form the amine derivative.

The described process may be illustrated as follows:

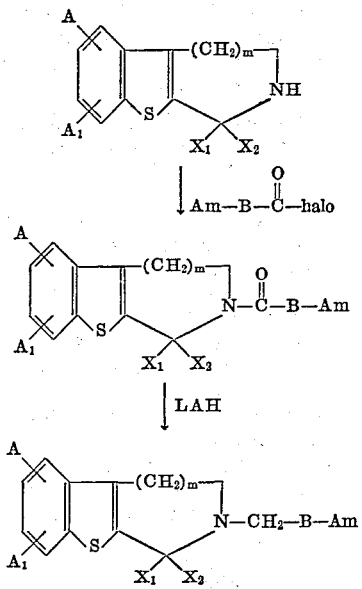

where $X_1$, $X_2$, A and $A_1$ are as described and do not interfere with or partake in the reaction.

Representative of the aminoacylhalides which may be used in the above described process are the following:

3-(diethylamino)propionyl halide,
2-(dimethylamino)acetyl halide,
3-(N-benzyl-N-methylamino)propionyl bromide,
2-(N,N-dibenzylamino)acetyl halide,
3-(N-phenyl-N-methylamino)propionyl bromide,
γ-(N-methylpiperazino)butyryl chloride,
β-(N-methylpiperazino)propionyl chloride,
β-(morpholino)propionyl chloride,
β-[3-(N-methyl)pyrrolidyl]propionyl chloride, and
γ-(piperidyl)butyryl chloride.

Representative of the compounds which may be prepared in the described manner are the following:

2-β-diethylaminopropionyl-1-phenyl-1,2,3,4-tetrahydrobenzothieno[2,3-C]pyridine,
2-β-diethylaminopropionyl-1-phenyl-1,2,3,4-tetrahydro-5H-benzothieno[2,3-C]azepine,
2-β-diethylaminopropionyl-1-methyl-1,2,3,4-tetrahydrobenzothieno[2,3-C]pyridine,
2-β-diethylaminopropionyl-1-methyl-1,2,3,4-tetrahydro-5H-benzothieno[2,3-C]azepine,
2-β-dimethylaminoacetyl-1-phenyl-1,2,3,4-tetrahydrobenzothieno[2,3-C]pyridine,
2-β-dimethylaminoacetyl-1-phenyl-1,2,3,4-tetrahydro-5H-benzothieno[2,3-C]azepine,
2-β-dimethylaminoacetyl-1-methyl-1,2,3,4-tetrahydrobenzothieno[2,3-C]pyridine,
2-β-dimethylaminoacetyl-1-methyl-1,2,3,4-tetrahydro-5H-benzothieno[2,3-C]azepine,
1-ethyl-2-β-diethylaminopropionyl-6-chloro-1,2,3,4-tetrahydrobenzothieno[2,3-C]pyridine,
1-ethyl-2-β-diethylaminopropionyl-6-chloro-1,2,3,4-tetrahydro-5H-benzothieno[2,3-C]azepine,
1-γ-dimethylaminopropyl-2-acetyl-7-methoxy-1,2,3,4-tetrahydrobenzothieno[2,3-C]pyridine,
1-γ-dimethylaminopropyl-2-acetyl-7-methoxy-1,2,3,4-tetrahydro-5H-benzothieno[2,3-C]azepine,
1-4'-pyridyl-2-(β-N-methylpiperazinopropionyl)-8-fluoro-1,2,3,4-tetrahydrobenzothieno[2,3-C]pyridine,
2-β-diethylaminopropyl-1-phenyl-1,2,3,4-tetrahydrobenzothieno[2,3-C]pyridine,
2-β-diethylaminopropyl-1-phenyl-1,2,3,4-tetrahydro-5H-benzothieno[2,3-C]azepine,
2-β-diethylaminopropyl-1-methyl-1,2,3,4-tetrahydrobenzothieno[2,3-C]pyridine,
2-β-diethylaminopropyl-1-methyl-1,2,3,4-tetrahydro-5H-benzothieno[2,3-C]azepine,
2-β-dimethylaminoethyl-1-phenyl-1,2,3,4-tetrahydrobenzothieno[2,3-C]pyridine,
2-β-dimethylaminoethyl-1-phenyl-1,2,3,4-tetrahydro-5H-benzothieno[2,3-C]azepine,
2-β-dimethylaminoethyl-1-methyl-1,2,3,4-tetrahydrobenzothieno[2,3-C]pyridine,
2-β-dimethylaminoethyl-1-methyl-1,2,3,4-tetrahydro-5H-benzothieno[2,3-C]azepine,
1-β-dimethylaminoethyl-2-ethyl-7-methoxy-1,2,3,4-tetrahydrobenzothieno[2,3-C]pyridine,
1-ethyl-2-β-N-methylpiperazinoethyl-6-chloro-1,2,3,4-tetrahydrobenzothieno[2,3-C]pyridine, and
1-(4'-pyridyl)-2-(β-diethylaminoethyl)-6-trifluoromethyl-1,2,3,4-tetrahydrobenzothieno[2,3-C]pyridine.

The compounds in which R is a B—A*m* may also be prepared by first treating the corresponding unsubstituted compound with an α,β unsaturated acyl halide, such as acrylic halide, followed by treatment with an amine and lithium aluminum hydride.

The described process may be illustrated as follows:

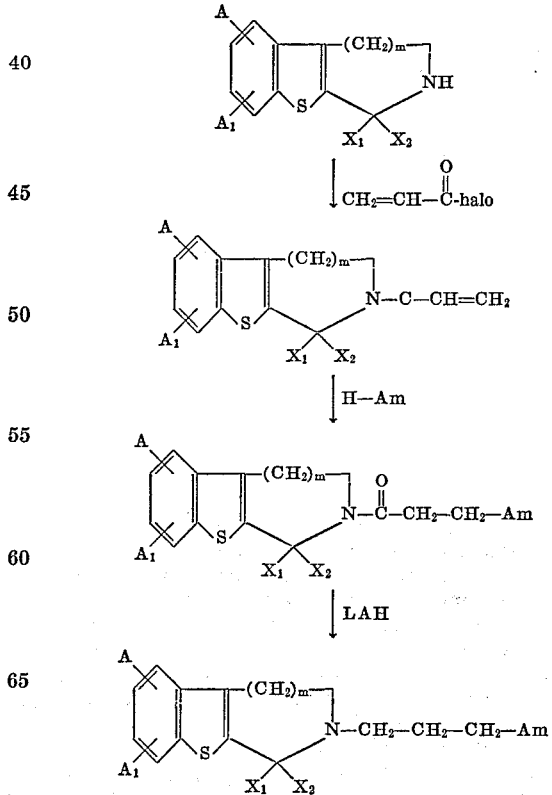

wherein $X_1$, $X_2$, A and $A_1$ are as described and do not partake in or interfere with the reaction.

The above described process provides a convenient means of preparing those compounds which might not be conveniently prepared by the use of aminoacylhalides because of their commercial unavailability.

Representative of the compounds which might be conveniently prepared by the described method are the following:

1-methyl-2-(β-4'-methylpiperazinopropionyl)-1-phenyl-1,2,3,4-tetrahydro-5H-benzothieno[2,3-C]pyridine,
1-methyl-2-(γ-4'-methylpiperazinopropyl)-1-phenyl-1,2,3,4-tetrahydrobenzothieno[2,3-C]pyridine,
1-methyl-2-(γ-4'-methylpiperazinopropyl)-1-phenyl-1,2,3,4-tetrahydro-5H-benzothieno[2,3-C]azepine,
1-methyl-2-(γ-4'-methylpiperazinopropyl)-1-methyl-1,2,3,4-tetrahydrobenzothieno[2,3-C]pyridine,
1-methyl-2-(γ-4'-methylpiperazinopropyl)-1-methyl-1,2,3,4-tetrahydro-5H-benzothieno[2,3-C]azepine,
2-(β-4'-methylpiperazinopropionyl)-1-phenyl-1,2,3,4-tetrahydrobenzothieno[2,3-C]pyridine,
2-(β-4'-methylpiperazinopropionyl)-1-phenyl-1,2,3,4-tetrahydro-5H-benzothieno[2,3-C]azepine,
2-(γ-4'-methylpiperazinopropyl)-1-phenyl-1,2,3,4-tetrahydrobenzothieno[2,3-C]pyridine,
2-(γ-4'-methylpiperazinopropyl)-1-phenyl-1,2,3,4-tetrahydro-5H-benzothieno[2,3-C]azepine,
2-(γ-4'-methylpiperazinopropyl)-1-methyl-1,2,3,4-tetrahydrobenzothieno[2,3-C]pyridine,
6-chloro-1-(β-dimethylaminoethyl)-2-(β'-N'-hydroxyethylpiperazinopropionyl)-1,2,3,4-tetrahydrobenzothieno[2,3-C]pyridine,
1-ethyl-7-hydroxy-2-(β-diethylaminopropionyl)-1,2,3,4-tetrahydrobenzothieno[2,3-C]pyridine,
1-(4'-pyridyl)-2-(β'-N-methylpiperazinopropionyl)-1,2,3,4-tetrahydrobenzothieno[2,3-C]pyridine, and
1-[4'-(N'-methylpiperidyl)]-6-methoxy-2-propionyl-1,2,3,4-tetrahydrobenzothieno[2,3-C]pyridine.

A variety of compounds in which R is other than amino may also be prepared by use of conventional techniques. For example, the compounds in which R is hydroxyethyl may be prepared by treating the corresponding 1-substituted compound with ethylene oxide. The described reactions may be illustrated as follows:

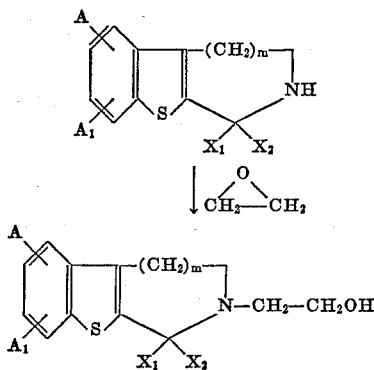

in which $X_1$, $X_2$, A and $A_1$ are as described and do not partake in or interfere with the reactions.

The novel compounds of the present invention may be used as intermediates in the preparation of more complex chemical and pharmaceutical compounds, and because of their antiserotonin activity are valuable pharmacological tools. In addition, they are useful as pharmaceutical agents, per se, because of their antipsychotic properties, especially their ability to control antisocial aggressive behavior when administered to animals. For example, the compounds 1 - (3,4 - dimethoxybenzyl)-1,2,3,4-tetrahydrobenzothieno[2,3-C]pyridine hydrochloride, 2 - β - diethylaminopropionyl - 1 - phenyl-1,2,3,4-tetrahydrobenzothieno[2,3-C]pyridine hydrochloride, 1-(p-chlorophenyl) - 1,2,3,4 - tetrahydrobenzothieno-[2,3-C]pyridine and 2 - β - hydroxyethyl - 1 - methyl-1,2,3,4 - tetrahydrobenzothieno[2,3 - C]pyridine hydrochloride have shown at a safe and effective dose of approximately 20 mg./kg. intraperitoneally an ability to decrease or inhibit the antisocial behavioral characteristics such as aggressiveness, viciousness and persistence for fighting, induced by isolation in mice. The compounds were found to have $LD_{50}$'s in mice in excess of 50 mg./kg. intraperitoneally in behavioral studies conducted in accordance with procedures outlined by Irwin in "Animal and Clinical Pharmacologic Techniques in Drug Evaluation," J. H. Nodine and P. E. Siegler, Ed., Year Book Publishers, Inc. 1964, pp. 36–54.

The following compounds were found to lower blood pressure when administered in 3.0 and 10.0 mg./kg. intravenous doses to the vagotomized, anesthesized dog preparation, which is a standard animal preparation for testing for antihypertensive activity.

1-(3,4-dimethoxybenzyl)-1,2,3,4-tetrahydrobenzothieno-[2,3-C]pyridine hydrochloride,
2-β-diethylaminopropionyl-1-phenyl-1,2,3,4-tetrahydrobenzothieno[2,3-C]pyridine hydrochloride, and
2-β-hydroxyethyl-1-methyl-1,2,3,4-tetrahydrobenzothieno[2,3-C]pyridine hydrochloride The novel compounds in which R is B—Am are also useful as they form salts with penicillins which can be used to aid in the isolation and purification of the antibiotics.

Acid addition salts of the compounds of the present invention may be conveniently prepared by contacting the compounds which are capable of forming such salts with a suitable acid such as formic acid, citric acid, maleic acid, sulfuric acid, hydrochloric acid, succinic acid, tartaric acid, benzoic acid or fumaric acid.

Quaternary ammonium salts may be formed by contacting the salt forming compounds with a suitable alkylating agent such as dimethyl sulfate or an alkyl halide such as methyl chloride, methyl iodide or ethyl bromide.

When intended for use as pharmaceuticals, the compounds are preferably combined with a major amount of one or more suitable pharmaceutical diluents and formed into unit dosage forms. Such dosage forms provide suitable means for oral and parenteral administration.

The pharmaceutical diluents which may be employed may be either liquid or solid, but the preferred liquid carrier is water. In the event the compound is not soluble in water a pharmaceutically acceptable organic solvent such as propylene glycol may be employed.

Solid pharmaceutical diluents such as starch, sugar and talc can be utilized to form powders which can in turn be used as such or may be tableted or encapsulated. In addition to the forementioned material, a wide variety of conventional pharmaceutical lubricants, disintegrating agents, flavoring agents and the like, may also be employed.

The unit dosage forms may contain a concentration of 0.1% to 10% or more by weight of one or more of the novel compounds. Generally, such dosage forms will contain about 5 to 250 mg. of the active ingredients. One or more of such dosage forms may be administered daily. The following examples are presented to illustrate this invention:

EXAMPLE 1

β-(3-thianaphthenyl)ethylamine

To a suspension of 21 g. (0.55 mole) of lithium aluminum hydride in 450 ml. of anhydrous ether is added a solution of 31.7 g. (0.18 mole) of 3-cyanomethylthianaphthene in 350 ml. of anhydrous ether in 45 minutes. The mixture is stirred at room temperature for 3 hours after which the complex is decomposed by the dropwise addition of 80 ml. of water. The solids are removed by filtration and washed with ether. The filtrate is dried and concentrated in vacuo to yield a brown oil which is fractioned to yield β-(3-thianaphthenyl)ethylamine in the form of a clear liquid, B.P. 109–110°/0.3 mm.

*Analysis.*—Calcd. for $C_{10}H_{11}NS$ (percent): C, 67.75; H, 6.26; N, 7.90. Found (percent): C, 67.49; H, 6.50; N, 7.92.

EXAMPLE 2

N-β-(3-thianaphthenylethyl)acetamide

To 5.6 g. (0.03 mole) of β-(3-thianaphthenyl)ethylamine is added 72 ml. of 20% sodium hydroxide solution with cooling in 10 minutes. Acetic anhydride (20 ml.) is then added dropwise with cooling within 15 minutes, after which the mixture is stirred with cooling for 1 hour and at room temperature for 16 hours. The mixture is extracted three times with 100 ml. portions of ether. The extracts are combined and washed three times with 50 ml. of brine, dried, and concentrated in vacuo to yield a clear liquid which is crystallized from benzene/petroleum-ether to yield N-β-(3-thianaphthenylethyl)acetamide in the form of a white crystalline solid, M.P. 67–68.5°.

*Analysis.*—Calcd. for $C_{12}H_{13}NOS$ (percent): S, 14.62. Found (percent): S, 14.73.

EXAMPLE 3

1-methyl-3,4-dihydrothianaphtheno[2,3-C]pyridine

A mixture of 2.4 g. of phosphorus pentoxide, 1.3 g. of N - β - (3-thianaphthenylethyl)acetamide, and 2.4 g. of phosphorus oxychloride in 40 ml. of anhydrous xylene (over sodium) is allowed to reflux under nitrogen for 70 minutes.

The mixture is decomposed with ice and the mixture stirred until a clear aqueous layer is formed. The aqueous layer is separated, washed with benzene, made basic with concentrated sodium hydroxide solution, and extracted with three 100 ml. portions of benzene. The combined benzene extracts are dried over anhydrous sodium sulfate and the solvent distilled under diminished pressure to give a solid product. After one recrystallization from petroleum ether 1 - methyl-3,4-dihydrothianaphtheno[2,3-C]pyridine, M.P. 73.5°, in the form of light yellow needles is obtained.

*Analysis.*—Calcd. for $C_{12}H_{11}NS$ (percent): S, 15.97. Found (percent): S, 15.98.

EXAMPLE 4

1-methyl-1,2,3,4-tetrahydrobenzothieno[2,3-C]pyridine hydrochloride

To a dispersion of 1.6 g. (0.042 mole) of lithium aluminum hydride in 250 ml. of ether is added a solution of 2.1 g. (0.01 mole) of 1 - methyl-3,4-dihydrobenzothieno [2,3-C]pyridine in 50 ml. of ether in 20 minutes, after which it is refluxed for 5 hours. The mixture is cooled and the complex decomposed with the dropwise addition of 15 ml. of water. The solids are removed by filtration and the filtrate dried and made acidic with ethereal hydrogen chloride. The resulting solids are collected and recrystallized twice from ethanol to yield 1-methyl-1,2,3,4-tetrahydrobenzothieno[2,3-C]pyridine hydrochloride in the form of a white crystalline solid, M.P. 255–257°.

*Analysis.*—Calcd. for $C_{12}H_{14}ClNS$: (percent): C, 60.12; H, 5.88; N, 5.83; S, 13.38. Found (percent): C, 60.16; H, 5.79; N, 5.87; S, 13.46.

EXAMPLE 5

1-(p-chlorophenyl)-1,2,3,4-tetrahydrobenzothieno[2,3-C]pyridine

A solution of 3.0 g. (0.017 mole) of β-(3-thianaphthenyl) ethylamine and 3.1 g. of (0.022 mole) of p-chlorobenzaldehyde in 10 ml. of glacial acetic acid is heated on a steam bath for 20 minutes after which it is stirred at room temperature overnight. It is then diluted with 75 ml. of water, adjusted to basicity by the addition of potassium carbonate and cooled. The precipitated solids are collected and recrystallized from isopropanol to yield 1-(p-chlorophenyl)-1,2,3,4-tetrahydrobenzothieno [2,3-C]pyridine in the form of a light textured white crystalline solid, M.P. 57.5–60°.

*Analysis.*—Calcd. for $C_{17}H_{14}ClNS$ (percent): C, 68.12; H, 4.71; S, 10.69. Found (percent): C, 68.14; H, 4.49; S, 10.84.

EXAMPLE 6

1-(4'-pyridyl)-1,2,3,4-tetrahydrobenzothieno[2,3-C]pyridine

A solution of 3.0 g. (0.017 mole) of β-(3-thianaphthenyl) ethylamine and 2.36 g. (0.022 mole) of 4-pyridine-carboxaldehyde in 10 ml. of glacial acetic acid is heated on a steam bath for 20 minutes after which it is stirred at room temperature for 5 hours. It is then diluted with 100 ml. of water, adjusted to basicity by the addition of sodium carbonate and extracted twice with 50 ml. portions of ether. The extracts are combined, washed with brine, dried and concentrated to yield an oil which is fractioned to yield 1 - (4'-pyridyl)-1,2,3,4-tetrahydrobenzothieno[2,3-C]pyridine in the form of a clear yellow oil, B.P. 167–171°/0.025 mm.

*Analysis.*—Calcd. for $C_{16}H_{14}N_2S$ (percent): C, 72.14; H, 5.30; N, 10.52; S, 12.04. Found (percent): C, 71.79; H, 5.51; N, 10.33; S, 12.32.

EXAMPLE 7

1-phenyl-1,2,3,4-tetrahydrobenzothieno[2,3-C]pyridine

To a solution of 6.1 g. (0.03 mole) of β-(3-thianaphthenyl)ethylamine in 30 ml. of glacial acetic acid is added 4.9 ml. (5.2 g., 0.05 mole) of benzaldehyde. It is heated on a steam bath for 20 minutes and stirred at room temperature for 16 hours. It is then diluted with 150 ml. of water, neutralized with potassium carbonate and extracted twice with 100 ml. portions of ether. The extracts are combined, washed with 50 ml. of brine, and concentrated to yield a solid which is recrystallized from isopropanol to yield 1 - phenyl-1,2,3,4-tetrahydrobenzothieno[2,3-C] pyridine in the form of a light-green crystalline solid in two crops, M.P. 58–59°.

*Analysis.*—Calcd. for $C_{17}H_{15}NS$ (percent): C, 76.96; H, 5.69; N, 5.28; S, 12.08. Found (percent): C, 77.11; H, 5.85; N, 5.43; S, 12.26.

EXAMPLE 8

2-β-diethylaminopropionyl-1-phenyl-1,2,3,4-tetrahydrobenzothieno[2,3-C]pyridine hydrochloride To a solution of 4.3 g. (0.024 mole) of 3-(diethylamino) propionic acid hydrochloride in 5 ml. of water is added 0.95 g. (0.024 mole) of sodium hydroxide flakes and the mixture is cooled until a clear solution is obtained. Benzene (100 ml.) is added and the mixture concentrated to yield a viscous oil to which 20 ml. of thionyl chloride is added in 5 minutes. The mixture is stirred at room temperature 1.5 hours, heated to 60° and the excess thionyl chloride removed in vacuo after which two 50 ml. portions of benzene are added and successively concentrated. Benzene (100 ml.) and 3.84 g. (0.038 mole, 5.3 ml.) of triethylamine are added to the above mixture. The reaction mixture is cooled to 30° and a solution of 5.0 g. (0.019 mole) of 1-phenyl-1,2,3,4-tetrahydrobenzothieno[2,3-C] pyridine in 50 ml. of benzene is added in 5 minutes. It is stirred at room temperature 0.5 hours, heated to 80° for 20 minutes, cooled to room temperature and filtered. The filtrate is concentrated to yield a dark residue which is dissolved in 250 ml. of water and 50 ml. of brine, washed with benzene, ether, and finally filtered. The filtrate is made basic with 10% sodium hydroxide solution and extracted twice with benzene. The combined extract is treated with activated charcoal and concentrated to yield a viscous oil. Petroleum ether (200 ml.) is added to the residue, refluxed for ½ hour and decanted. This procedure is repeated and the combined organic solution concentrated to yield a gold oil which is dissolved in ether and made acidic by the addition of ethereal hydrogen chloride. The solid is collected and recrystallized from a solution of benzene and cyclohexane to yield 2-β-diethylaminopropionyl-1-phenyl - 1,2,3,4 - tetrahydrobenzothieno[2,3-C]pyridine hydrochloride in the form of a light grey powder, M.P. 188–189.5°.

*Analysis.*—Calcd. for $C_{24}H_{29}ClN_2OS$ (percent): C, 67.18; H, 6.82; Cl–, 8.26; N, 6.53. Found (percent): C, 66.97; H, 6.71; Cl–, 8.26; N, 6.36.

EXAMPLE 9

2-γ-diethylaminopropyl-1-phenyl-1,2,3,4-tetrahydrobenzothieno[2,3-C]pyridine fumarate To a dispersion of 2.0 g. (0.053 mole) of lithium aluminum hydride in 200 ml. of ether is added a solution of 6.9 g. (0.018 mole) of 2-β-diethylaminopropionyl-1-phenyl-1,2,3,4-tetrahydrobenzothieno[2,3-C]pyridine in 20 minutes after which it is refluxed for 15½ hours. The compelx is decomposed by the addition of 15 ml. of water and the solids removed by filtration. The filtrate is concentrated and the residual oil chromatographed through aluminum oxide (200 g., 3 cm.) using 1.2 liters of varying proportions of benzene and petroleum ether to yield an oil. It is dissolved in 25 ml. of ethanol and a solution of 0.93 g. (0.008 mole) of fumaric acid in 25 ml. of ethanol added. The solution is diluted with petroleum ether and cooled. The mother liquor is decanted and the semisolid residue covered with ether and again cooled. After the material has completely solidified, it is collected and recrystallized from 20 ml. of isopropanol and again from 25 ml. of ethanol and diluted with ether to yield 2-γ-diethylaminopropyl - 1 - phenyl-1,2,3,4-tetrahydrobenzothieno[2,3-C]pyridine fumarate in the form of a light grey powder, M.P. 106–109°.

*Analysis.*—Calcd. for $C_{28}H_{34}N_2O_4S$ (percent): C, 68.00; H, 6.93; N, 5.66. Found (percent): C, 68.12; H, 6.94; N, 5.70.

EXAMPLE 10

2-β-hydroxyethyl-1-methyl-1,2,3,4-tetrahydrobenzothieno[2,3-C]pyridine hydrochloride To a solution of 4.06 g. (0.02 mole) of 1-methyl-1,2,3,4-tetrahydrobenzothieno[2,3-C]pyridine in 40 ml. of absolute alcohol cooled to 0° is added 1.8 g. (0.04 mole) of ethylene oxide in 20 ml. of cooled absolute alcohol. The reaction mixture is stirred at room temperature for 3 hours and heated to reflux in 2 hours. It is concentrated in vacuo, and the syrup residue dissolved in 300 ml. of anhydrous ether. The insoluble material is removed by filtration. The filtrate is adjusted to pH 6 by the slow addition of ethereal hydrogen chloride, and the resulting solid collected and recrystallized twice from isopropanol to yield 2-β-hydroxyethyl-1-methyl-1,2,3,4-tetrahydrobenzothieno[2,3-C]pyridine hydrochloride in the form of a white powdered solid, M.P. 182–184°.

*Analysis.*—Calcd. for $C_{14}H_{18}ClNOS$ (percent): C, 59.24; H, 6.39; N, 4.94; S, 11.30. Found (percent): C, 59.04; H, 6.55; N, 4.94; S, 11.01.

EXAMPLE 11

1-(3,4-dimethoxybenzyl)-3,4-dihydrobenzothieno[2,3-C]pyridine

To a solution of 16.7 g. (0.117 mole) of phosphorus pentaoxide and 16.7 g. (0.109 mole, 10 ml.) of phosphorus oxychloride in 280 ml. of anhydrous xylene is added 14.6 g. (0.0412 mole) of N-(3,4-dimethoxyphenylacetyl)-β-3-thianaphthylethylamine in 2 minutes. The mixture is heated to 120° in 0.5 hour and maintained for 40 minutes. The mixture is cooled to 25° and poured into 400 ml. of ice water. The mixture is then added back to the original reaction flask and stirred with 10% sodium hydroxide solution (300 ml.) and 200 ml. of benzene at 50° for 3 hours. The organic layer is separated, treated with activated charcoal, dried, and concentrated to yield 1 - (3,4 - dimethoxybenzyl) - 3,4 - dihydrobenzothieno-[2,3-C]pyridine as a dark yellow oil which solidifies upon cooling.

EXAMPLE 12

1-(3,4-dimethoxybenzyl)-1,2,3,4-tetrahydrobenzothieno[2,3-C]pyridine hydrochloride A solution of 6.2 g. (0.018 mole) of 1-(3,4-dimethoxybenzyl) - 3,4 - dihydrobenzthieno[2,3-C]pyridine in 100 ml. of benzene is added to a dispersion of 2.8 g. (0.075 mole) of LAH in 200 ml. of ether in 10 minutes and refluxed for 3.5 hours. The complex is decomposed with 15 ml. of water. The solids are removed by filtration; the filtrate concentrated to yield an oil which is dissolved in 250 ml. of ether and filtered through Celite. The filtrate is again concentrated to yield the crude base.

A portion of this material (1.5 g.) is dissolved in 100 ml. of ether and adjusted to acidity by the addition of ethereal hydrogen chloride. The resulting solids are collected and recrystallized from 200 ml. of ethanol, concentrated to 75 ml., and diluted with ether to yield 1-(3,4-dimethoxybenzyl) - 1,2,3,4 - tetrahydrobenzothieno[2,3-C]pyridine hydrochloride as a yellow solid; M.P. 222–227°.

*Analysis.*—Calcd. for $C_{20}H_{22}ClNO_2S$ (percent): N, 3.73; S, 8.54. Found (percent): N, 3.65; S, 8.22.

EXAMPLE 13

β-(3-thianaphthenyl)propionamide

A mixture of 30 g. (0.145 mole) of 3-thianaphthenepropionic acid and 50 ml. (0.7 mole) of $SOCl_2$ is heated at 50–67° for 1.5 hours and allowed to cool to 30° in 1.5 hours. It is concentrated in vacuo and the residue dissolved in 50 ml. of ether. It is added dropwise to 100 ml. of $NH_4OH$ solution at 5° in 0.5 hour. The mixture is heated until all ether had been removed, cooled and the solids collected and dried to yield β-(3-thianaphthenyl)propionamide as a white solid; M.P. 98–100°.

*Analysis.*—Calcd. for $C_{11}H_{11}NSO$ (percent): C, 64.37; H, 5.40; N, 6.82. Found (percent): C, 64.87; H, 5.45; N, 6.84.

EXAMPLE 14

γ-(3-thianaphthenyl)propylamine hydrochloride

To a dispersion of 13.4 g. (0.354 mole) of $LiAlH_4$ in 200 ml. of ether is added a dispersion of 24.2 g. (0.118 mole) of 3-thianaphthenepropionamide in 800 ml. of ether in 0.5 hours. The mixture is refluxed for 16 hours after which 200 ml. of benzene is added and refluxed again for 1.5 hours. The complex is decomposed with 60 ml. of water and the solid removed by filtration. The filtrate is dried ($Na_2SO_4$), and concentrated to yield a theoretical amount of an oil. A 3.0 g. portion of this material is dissolved in ether and acidified with ethereal HCl. The solids are collected and recrystallized twice from 2-propional to yield γ-(3-thianaphthenyl)propylamine hydrochloride as white crystals, M.P. 187–189°.

*Analysis.*—Calcd. for $C_{11}H_{14}ClNS$ (percent): C, 58.00; H, 6.20; N, 6.16. Found (percent): C, 58.27; H, 6.30; N, 6.16.

EXAMPLE 15

N-propionyl-γ-(3-thianaphthenyl)propylamine

To a solution of 9.1 g. (0.098 mole) of propionyl chloride in 150 ml. of benzene is added a solution of 15 g. (0.0784 mole) of γ-(3-thianaphthenyl)propylamine and 7.75 g. (0.098 mole) of pyridine in 0.5 hour at 10°. The mixture is stirred at 10° for 1 hour, at 25° for 17.5 hours, and refluxed for 1.5 hours. The mixture is cooled and 100 ml. of water added and stirred 5 minutes. The organic layer is separated and washed successively with 100 ml. 10% HCl solution and 50 ml. of brine. It is dried ($Na_2SO_4$) and concentrated to yield the theoretical amount of a yellow oil. A 5.0 g. portion is chromatographed through alumina using varying proportions of benzene/petroleum ether and ether/ benzene to yield an oil which crystallized on standing to yield a light yellow solid, M.P. 55–57.5°.

*Analysis.*—Calcd. for $C_{14}H_{17}NSO$ (percent): C, 67.97; H, 6.92; N, 5.66; S, 12.95. Found (percent): C, 68.21; H, 6.92; N, 5.535; S, 13.08.

EXAMPLE 16

1-ethyl-3,4-dihydro-5H-benzothieno[2,3-C]azepine fumarate ethanolate

A mixture of 10 g. (0.0404 mole) of N-(propionyl)-3-(β-aminopropyl)thianaphthene, 16.4 g. (1.15 moles) of $P_2O_5$ and 16.4 g. (1.06 moles) of $POCl_3$ in 250 ml. of xylene is refluxed for 2 hours. The mixture is cooled and 400 ml. of water added. The mixture is basified with NaOH flakes after which 200 ml. of $CHCl_3$ is added and stirred 15 minutes. The organic layer is separated, washed with brine, dried ($Na_2SO_4$) and concentrated to yield a brown oil which is chromatographed through alumina using benzene as the eluent to yield a yellow oil which crystallized upon standing.

A portion of this material (2.5 g., 0.011 mole) is dissolved in 20 ml. of ethanol and added to a solution of 1.4 g. (0.012 mole) of fumaric acid in 25 ml. of ethanol, filtered and cooled. The solids are collected and dried to yield 1-ethyl-3,4-dihydro-5H-benzothieno[2,3-C]azepine fumarate ethanolate as a yellow solid, M.P. 158–160°.

*Analysis.*—Calcd. for $C_{20}H_{25}NSO_5$ (percent): C, 61.40; H, 6.40; N, 3.58; S, 8.19. Found (percent): C, 61.45; H, 6.72; N, 3.60; S, 8.15.

EXAMPLE 17

1-ethyl-1,2,3,4-tetrahydro-5H-benzothieno-[2,3-C]azepine hydrochloride

To a dispersion of 2.4 g. (0.63 mole) of $LiAlH_4$ in 100 ml. of tetrahydrofuran is added a solution of 3.6 g. (0.016 mole) of 1-ethyl-3,4-dihydro-5H-benzothieno-[2,3-C]azepine in 100 ml. of tetrahydrofuran in 10 minutes after which it is refluxed for 8 hours. The complex is decomposed with 15 ml. of water and filtered. The filtrate is dried and concentrated to yield an oil which was chromatographed through $Al_2O_3$ using ether as an eluent to yield a crystalline solid which is dissolved in ether and acidified with ethereal HCl. The solids are collected and refluxed in 60 ml. of acetonitrile and cooled. The solids are collected and dried to yield 1-ethyl-1,2,3,4-tetrahydro-5H-benzothieno[2,3-C]azepine hydrochloride as a white powder, M.P. 238–240°.

*Analysis.*—Calcd. for $C_{14}H_{18}ClNS$ (percent): C, 62.78; H, 6.78; N, 5.24. Found (percent): C, 62.97; H, 7.05; N, 5.04.

I claim:
1. A compound selected from the group consisting of a compound of the formula

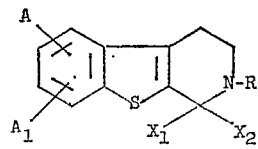

wherein A and $A_1$ are selected from hydrogen, lower alkyl, halo and trifluoromethyl; R is selected from hydrogen, $(CH_2)_nH$ in which $n$ is 2 to 6, and B—A$m$ in which B is lower alkylene of 2 to 6 carbon atoms and A$m$ is

in which $R_1$ and $R_2$ are hydrogen or lower alkyl; and $X_1$ is hydrogen and $X_2$ is phenyl halophenyl, lower-alkoxy benzyl and di-lower-alkoxy-benzyl, and the pharmaceutically acceptable acid addition salts thereof.

2. A compound of claim 1 in which A and $A_1$ are hydrogen.

3. A compound of claim 1 in which R is H and $X_2$ is phenyl, halophenyl, benzyl or lower alkoxy-substituted benzyl.

4. A compound of claim 1 in which R is B—A$m$ and $X_2$ is phenyl.

5. A compound of claim 1 in which A, $A_1$ and R are hydrogen and $X_2$ is chlorophenyl.

6. A compound of claim 1 in which A, $A_1$ and R are hydrogen and $X_2$ is dimethoxybenzyl.

7. A compound of claim 1 in which $X_2$ is phenyl and R is $(CH_2)_n$—OH in which $n$ is 2.

References Cited

UNITED STATES PATENTS 3,518,277  6/1970  Suh _____ 260—294.8

OTHER REFERENCES

Herz, J. Am. Chem. Soc., vol. 72, pp. 4999–5001 (1950).

Capps et al., J. Am. Chem. Soc., vol. 75, pp. 697–99 (1953).

Kotake et al., Chem. Abstracts, vol. 46, col. 6121-b (1952).

ALAN L. ROTMAN, Primary Examiner

U.S. Cl. X.R.

260—247.1, 268 TR, 293.57, 294.7 C, 313.1, 326.5 SA, 330.5; 424—250, 263, 267, 274, 275